(12) United States Patent
Hisano

(10) Patent No.: US 10,740,816 B2
(45) Date of Patent: Aug. 11, 2020

(54) PERSON AND MACHINE MATCHING DEVICE, MATCHING SYSTEM, PERSON AND MACHINE MATCHING METHOD, AND PERSON AND MACHINE MATCHING PROGRAM

(71) Applicant: Omron Corporation, Kyoto-shi, Kyoto (JP)

(72) Inventor: Atsushi Hisano, Kameoka (JP)

(73) Assignee: OMRON Corporation, Kyoto (JP)

(*) Notice: Subject to any disclaimer, the term of this patent is extended or adjusted under 35 U.S.C. 154(b) by 434 days.

(21) Appl. No.: 15/524,060

(22) PCT Filed: Nov. 11, 2014

(86) PCT No.: PCT/JP2014/079839
§ 371 (c)(1),
(2) Date: May 3, 2017

(87) PCT Pub. No.: WO2016/075757
PCT Pub. Date: May 19, 2016

(65) Prior Publication Data
US 2017/0316482 A1 Nov. 2, 2017

(51) Int. Cl.
*G06Q 30/00* (2012.01)
*G06Q 30/06* (2012.01)
(Continued)

(52) U.S. Cl.
CPC ......... *G06Q 30/0623* (2013.01); *G06Q 10/06* (2013.01); *G06Q 30/06* (2013.01); *G05B 15/02* (2013.01)

(58) Field of Classification Search
CPC .................................................. G06Q 30/0623
See application file for complete search history.

(56) References Cited

U.S. PATENT DOCUMENTS 9,654,591 B2* 5/2017 Matus ..................... H04L 67/22

FOREIGN PATENT DOCUMENTS

CN 102855410 A 1/2013
CN 103234763 A 8/2013
(Continued)

OTHER PUBLICATIONS

Laura Dipietro et al, "A Survey of Glove-Based Systems and Their Applications", IEEE Transactions on Systems, Man, and Cybernetics-Part C: Applications and Reviews, Jul. 2008, pp. 461-482, vol. 38 No. 4, IEEE, IEEE Service Center, New Jersey, US.*

(Continued)

*Primary Examiner* — Kathleen Palavecino
(74) *Attorney, Agent, or Firm* — Metrolex IP Law Group, PLLC

(57) ABSTRACT

A person and machine matching device (1), for each machine that operates according to operation of an operator, stores a machine type classified on a basis of operability of the machine, in a machine type DB (15). The person and machine matching device (1) determines matching between an operator type obtained by classifying an operator on the basis of a machine operation handling ability and the machine type classified on the basis of the operability of the machine. In addition, the person and machine matching device (1) generates and outputs matching determination result information with the machine of which the machine type is stored in the machine type DB (15), on the basis of a determination result obtained by determining the matching between the operator type of a specified operator and the machine type.

8 Claims, 16 Drawing Sheets

(51) Int. Cl.
*G06Q 10/06* (2012.01)
*G05B 15/02* (2006.01)

(56) References Cited

FOREIGN PATENT DOCUMENTS

| | | |
|---|---|---|
| JP | 2008-134972 A | 6/2008 |
| JP | 2010-257106 A | 11/2010 |
| JP | 2012-058986 A | 3/2012 |

OTHER PUBLICATIONS

The supplementary European search report and the European search opinion dated Nov. 17, 2017 in the counterpart European patent application.

Xue Wenxiang, "What Can You Drive? A List of Driving Licenses Corresponding to Quasi-Driving Types", Truck House, http://www.360che.com/law/100121/9039.html, Jan. 22, 2010; Relevance is indicated in the CNOA issued on Apr. 23, 2020.

Zhang Xiaoli, "Collaborative Filtering Recommendation Model and Its Application Research in Automotive Ecommerce", "Full-Text Database Economics and Management Science Series of Excellent Masterchar(39)s Degree Thesis of China", Nov. 15, 2010; Relevance is indicated in the CNOA issued on Apr. 23, 2020.

Chinese Office Action (CNOA) dated Apr. 23, 2020 in a counterpart Chinese patent application.

* cited by examiner

Fig.3

17: MACHINE TYPE CLASSIFICATION TABLE

| | OPERATING CHARACTERISTICS OF VISUAL INTERFACE | | OPERATING CHARACTERISTICS OF DYNAMIC OPERATION | | | OPERATING CHARACTERISTICS OF INFORMATION UNDERSTANDING | |
|---|---|---|---|---|---|---|---|
| | POSITION AND SIZE OF SCREEN | SIZE AND TYPE OF LETTER | FINGERTIP | GRIP | ROTATION, PUSH-PULL | AMOUNT AND DEPTH OF NECESSARY KNOWLEDGE | COMPLEXITY OF OPERATION |
| MACHINE FOR DISPLAY | LARGE | LARGE | SMALL | LARGE | LARGE | SMALL | SMALL |
| MACHINE FOR SPECIFIC CUSTOMER | SMALL | SMALL | SMALL | SMALL | SMALL | SMALL | SMALL |
| MACHINE FOR SCHOOL EDUCATION | LARGE | LARGE | SMALL | SMALL | SMALL | SMALL | SMALL |
| MACHINE FOR RESEARCH INSTITUTE | LARGE | LARGE | LARGE | MEDIUM | MEDIUM | LARGE | LARGE |
| MACHINE FOR ELDERLY PERSON | SMALL | SMALL | MEDIUM | MEDIUM | MEDIUM | LARGE | LARGE |
| MACHINE FOR PROFESSIONAL USE | LARGE | LARGE | LARGE | LARGE | LARGE | LARGE | LARGE |

Fig.4

18: OPERATOR TYPE CLASSIFICATION TABLE

| | OPERATING CHARACTERISTICS OF VISUAL INTERFACE | | OPERATING CHARACTERISTICS OF DYNAMIC OPERATION | | | OPERATING CHARACTERISTICS OF INFORMATION UNDERSTANDING | |
|---|---|---|---|---|---|---|---|
| | POSITION AND SIZE OF SCREEN | SIZE AND TYPE OF LETTER | FINGERTIP | GRIP | ROTATION, PUSH-PULL | AMOUNT AND DEPTH OF NECESSARY KNOWLEDGE | COMPLEXITY OF OPERATION |
| UNSKILLED YOUNG PERSON | LARGE | LARGE | SMALL | LARGE | LARGE | SMALL | SMALL |
| UNSKILLED ELDERLY PERSON | SMALL | SMALL | SMALL | SMALL | SMALL | SMALL | SMALL |
| CHILD | LARGE | LARGE | LARGE | SMALL | SMALL | SMALL | SMALL |
| ENTHUSIASTIC CHILD | LARGE | LARGE | LARGE | MEDIUM | MEDIUM | LARGE | LARGE |
| ENTHUSIASTIC ELDERLY PERSON | SMALL | SMALL | MEDIUM | MEDIUM | MEDIUM | LARGE | LARGE |
| SKILLED YOUNG PERSON | LARGE | LARGE | LARGE | LARGE | LARGE | LARGE | LARGE |

Fig.5

19: MATCHING TABLE

| | MACHINE FOR DISPLAY | MACHINE FOR SPECIFIC CUSTOMER | MACHINE FOR SCHOOL EDUCATION | MACHINE FOR RESEARCH INSTITUTE | MACHINE FOR ELDERLY PERSON | MACHINE FOR PROFESSIONAL USE |
|---|---|---|---|---|---|---|
| UNSKILLED YOUNG PERSON | ○ | ? | ? | ? | ? | × |
| UNSKILLED ELDERLY PERSON | × | ○ | ? | ? | ? | × |
| CHILD | × | ? | ○ | ? | × | × |
| ENTHUSIASTIC CHILD | ○ | ? | ? | ○ | ? | × |
| ENTHUSIASTIC ELDERLY PERSON | ○ | ? | ? | ? | ○ | ○ |
| SKILLED YOUNG PERSON | × | ? | × | ○ | × | ○ | ial
PERSON AND MACHINE MATCHING DEVICE, MATCHING SYSTEM, PERSON AND MACHINE MATCHING METHOD, AND PERSON AND MACHINE MATCHING PROGRAM

TECHNICAL FIELD

The present invention relates to a technology for presenting to a person a machine of which the operability matches the operation ability of the person.

BACKGROUND ART

In order that machines such as a vehicle, a television, a personal computer, and a smart phone, may meet the diverse needs of a user, various machines (models) of which the designs, the functions, or the like are different are manufactured and marketed. While the user feels the advantages of such diversified models that have expanded the range of selections for a model to purchase, the user also feels the disadvantages of the diversified models that cause a lot of trouble with selecting a model to purchase.

In Patent Literature 1, a proposal has been made to allow a user to efficiently select a model. Specifically, the Patent Literature 1 proposes a device that, based on use history information of functions of a portable terminal of a user, determines a necessary function among the respective functions of the portable terminal in use, and extracts and shows a model including the necessary function as a recommended model among models available for model change.

CITATION LIST

Patent Literature

Patent Literature 1: Japanese Patent Laid-Open publication No. 2010-257106

SUMMARY OF INVENTION

Technical Problem

However, the technique proposed mainly in the Patent Literature 1 only presented a model (a portable terminal in Patent Literature 1) provided with a function necessary for a user. In other words, the technique presents a recommended model without taking into consideration of whether the user can operate the model smoothly or whether the user may have difficulty in operation.

On the other hand, the model that a user can operate smoothly is a model of which the operability matches the machine operation handling ability of the user to some extent. Various factors that affect the operability of a machine include the size of a display screen being a visual interface, the size or the relative positional relationship of operating parts such as a button or a lever, the amount of force necessary for the operation of an operating part, the complexity of a series of operations during use of function, and the speed of response accompanying the operation of the operating part. In addition, the machine operation handling ability, for each user, differs in not only physical characteristics of a user, such as eyesight, hearing ability, muscular power, and the size of hands and fingers, but also a manual dexterity, a personality and other factors.

Consequently, in the technique mainly proposed in the above described Patent Literature 1, a model of which the operability does not match the machine operation handling ability of a user, that is, a model that a user cannot operate smoothly may be presented to a user. The model that a user cannot operate smoothly is a model of which the usability for the user is low.

An object of the present invention is to provide a technology for presenting, by determining matching between the operability of a machine and the machine operation handling ability of a user being an operator, a machine that the operator can operate smoothly.

Solution to Problem

In order to achieve the object, a person and machine matching device of the present invention is configured as follows.

A machine type storage unit stores a machine type obtained by classifying a machine that operates according to operation of an operator on the basis of the operability of the machine. The machine as referred to in the present invention does not belong to the classification by a vehicle, television, a personal computer, or a smart phone (herein referred to as large classification) but belongs to the classification by the types of machines (models) (herein referred to as small classification).

The machine type of the machine that operates according to operation of an operator may be identified, for example, using a characteristic value related to operability, the characteristic value having been input with respect to the machine. The characteristic value related to operability may be acquired by actually operating a machine or may be acquired by estimating based on design data of the machine.

A matching determination unit determines matching between an operator type obtained by classifying an operator on the basis of a machine operation handling ability and a machine type classified on the basis of the operability of a machine.

The operator type may be identified, for example, using a characteristic value related to the machine operation handling ability, the characteristic value having been input with respect to the operator. The characteristic value related to the machine operation handling ability of an operator may be acquired by making the operator actually run simulation related to machine operation.

A matching determination result information generation unit generates matching determination result information with the machine of which the machine type is stored in the machine type storage unit, on a basis of a determination result obtained by the matching determination unit that has determined the matching between the operator type of a specified operator and the machine type.

The matching determination result information generation unit, for example, may be configured to extract from the machine type storage unit a machine of the machine type matching the operator type of the specified operator and to generate a list of an extracted machine as the matching determination result information or may be configured to, for each specified machine, generate a list associated with a determination result in the matching determination unit as the matching determination result information.

In addition, an output unit outputs the matching determination result information that has been generated by the matching determination result information generation unit.

Accordingly, such a configuration makes it possible to present a machine determined by matching the operability of the machine and the machine operation handling ability of a user being an operator (in other words, a machine that a user can operate smoothly) to the user.

In addition, the specification of an operator to a person and machine matching device or the specification of a machine may be configured to be performed from a personal computer or a terminal such as a portable terminal.

In addition, a machine type classification table storage unit may preferably store, for each machine type, a machine type classification table in which a size of a range handled by an operator is determined, with respect to a plurality of items related to one operability of a machine. Then, a machine type identification unit, with respect to the plurality of items related to the operability of a machine, may be configured to calculate the size of the range handled by the operator from the characteristic value related to the operability, the characteristic value having been input with respect to the machine, and to identify a corresponding machine type, referring to the machine type classification table.

In addition, an operator type classification table storage unit may preferably store, for each operator type, an operator type classification table in which a size of the machine operation handling ability of the operator is determined, with respect to a plurality of items related to machine operation. Then, an operator type identification unit, with respect to the plurality of items related to machine operation, may be configured to calculate the size of the operation handling ability of the operator, using an input characteristic value related to the machine operation handling ability, and to identify a corresponding operator type, referring to the operator type classification table.

Further, a matching table storage unit may preferably store a matching table in which whether or not the machine type and the operator type are matched is determined for each combination of the machine type and the operator type. Then, the matching determination unit may be configured to determine matching between the machine type and the operator type, referring to the matching table.

In addition, a data structure of a machine type classification table according to the present invention is a data structure of a machine type classification table that a computer uses in order to identify a corresponding machine type, using a size of a range handled by an operator, the size having been calculated from a characteristic value related to operability, the characteristic value having been input with respect to a plurality of items related to the operability of a machine, and, for each machine type, the size of the range handled by the operator is determined with respect to the plurality of items related to the operability of a machine.

In addition, a data structure of an operator type classification table according to the present invention is a data structure of an operator type classification table that a computer uses in order to identify a corresponding operator type, using a size of an operation handling ability, the size having been calculated from a characteristic value related to the operation handling ability, the characteristic value having been input with respect to a plurality of items related to the machine operation of an operator, and, for each operator type, the size of the operation handling ability of the operator is determined with respect to the plurality of items related to the machine operation of an operator.

Advantageous Effects of Invention

According to the present invention, a machine determined by matching the operability of the machine and the machine operation handling ability of an operator, that is, a machine that an operator can operate smoothly, is able to be presented.

BRIEF DESCRIPTION OF DRAWINGS

FIG. 3 illustrates a data structure of a machine type classification table;

FIG. 4 illustrates a data structure of an operator type classification table;

FIG. 5 illustrates a data structure of a matching table;

DETAILED DESCRIPTION OF PREFERRED EMBODIMENTS

Hereinafter, preferred embodiments of the present invention will be described.

Figure 1:
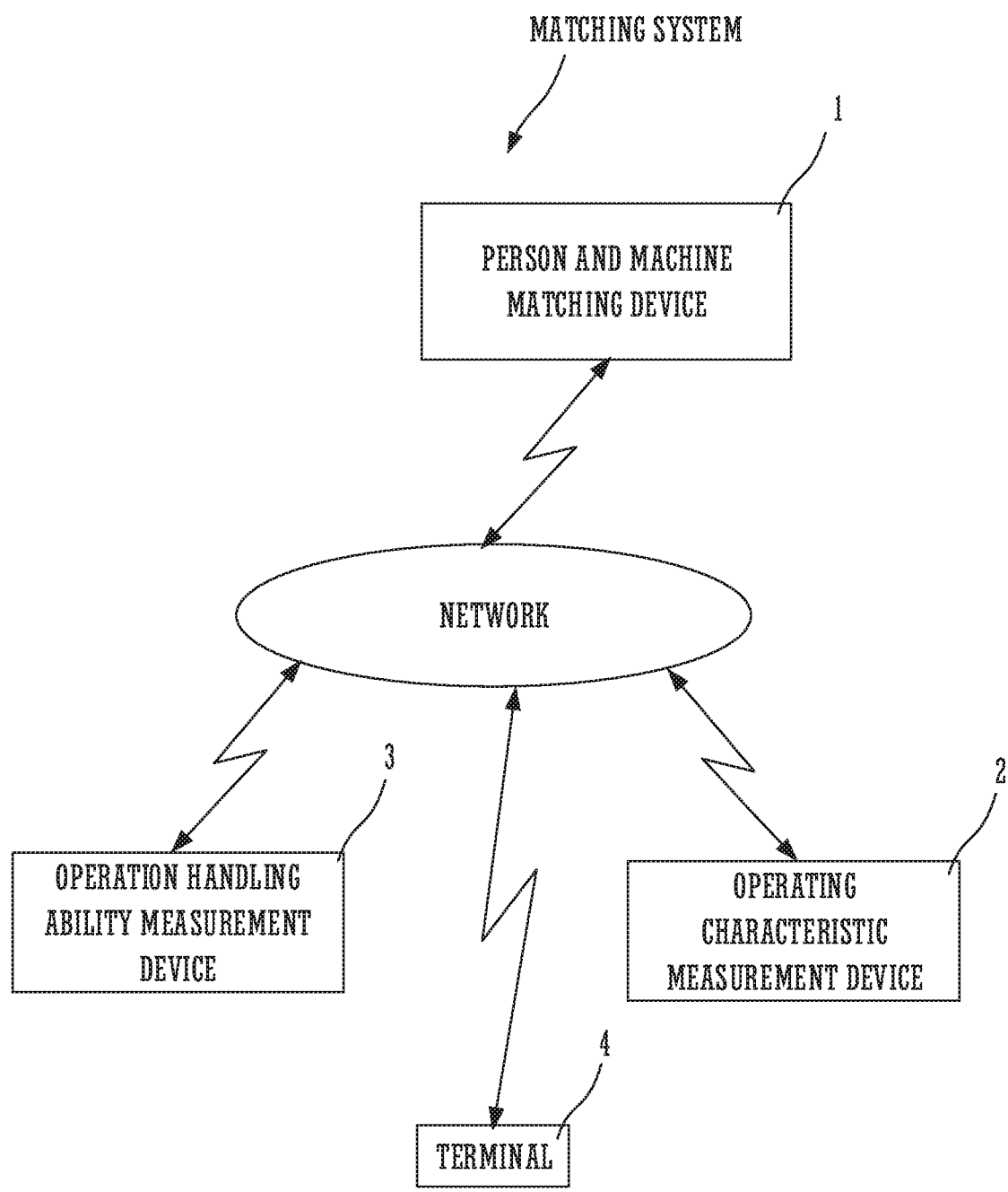
FIG. 1 is a schematic diagram illustrating a configuration of a matching system.

FIG. 1 is a schematic diagram illustrating a configuration of a matching system according to a preferred embodiment of the present invention. The matching system is provided with a person and machine matching device 1, an operating characteristic measurement device 2, an operation handling ability measurement device 3, and a terminal 4. The person and machine matching device 1 is connected to the operating characteristic measurement device 2, the operation handling ability measurement device 3, and the terminal 4 through a network. The person and machine matching device 1 performs data communication with the operating characteristic measurement device 2, the operation handling ability measurement device 3, and the terminal 4 through the network. The network that connects the person and machine matching device 1 and the operating characteristic measurement device 2, the network that connects the person and machine matching device 1 and the operation handling ability measurement device 3, and the network that connects the person and machine matching device 1 and the terminal 4 may be the same network or may be different networks.

The person and machine matching device 1 presents to a specified operator (registrant) a machine of which the operability matches the machine operation handling ability of the registrant. The person and machine matching device 1 does not present a machine by classification according to main functions such as a vehicle, television, a personal computer, and a smart phone (such a classification may also be referred to as large classification in the preferred embodiment of the present invention) but presents a machine by classification of machines that belong to the large classification according to the manufacturers of the machines and the types of the machines (model) determined by the manufacturers, such as XXX of Company A, XYZ of Company A, and XZZ of Company B (such a classification may also be referred to as small classification in the preferred embodiment of the present invention).

The operating characteristic measurement device 2, although being described in detail later, performs a process to acquire a characteristic value related to the operability of a machine. Such a characteristic value related to operability is acquired by making an operator who wears a measurement device such as a data glove and a wearable camera to be described later actually operate a machine and then processing the output of each measurement device during operation. Examples of the characteristic value related to operability include operating characteristics of a visual interface, operating characteristics of dynamic operation, and operating characteristics of information understanding.

The operating characteristics of a visual interface are operating characteristics related to reading of information displayed on a display screen, and the installation position and the size of the display screen that displays information, the size of a letter to be displayed on the display screen, a font, and a language are mainly measured as a characteristic value. As the operating characteristics of dynamic operation, the relative positional relationship of respective operating parts, such as a handle, a lever, a button, and a pedal, the size of the respective operating parts, the operating methods (such as pressing, rotating, and pushing-pulling) of the respective operating parts, the amount of force necessary for the operation of the respective operating parts are mainly measured as a characteristic value. As the operating characteristics of information understanding, knowledge to determine a situation from output information by display or sound, the complexity of operation of continuously operating a plurality of operating parts according to a determined situation, and the speed of response accompanying the operation of an operating part are mainly measured as a characteristic value. The operating characteristic measurement device 2, for each model (a machine of the small classification), inputs a characteristic value related to operability measured with respect to the model, to the person and machine matching device 1.

The person and machine matching device 1, for each model of which the characteristic value related to the operability of the model has been input from the operating characteristic measurement device 2, identifies a machine type classified on the basis of an input characteristic value related to the operability of the model. In addition, the person and machine matching device 1, for each model of which the characteristic value related to the operability of the model has been input from the operating characteristic measurement device 2, generates a machine type record in which an identification code (machine ID) of the model, a code indicating the large classification of the model (code indicating a vehicle, a television, a personal computer, smart phone, and the like), a manufacturer, a machine type name (model name), and a machine type are associated with each other, and registers the machine type record in a database.

The operation handling ability measurement device 3, although being described in detail later, performs a process to acquire a characteristic value related to the machine operation handling ability of an operator. The operation handling ability measurement device 3 makes an operator run simulation related to machine operation, and measures a characteristic value of the operation handling ability of a visual interface, a characteristic value of the operation handling ability of dynamic operation, and a characteristic value of the operation handling ability of information understanding. The operation handling ability measurement device 3 inputs the characteristic value related to a measured machine operation handling ability of the operator into the person and machine matching device 1. The operation handling ability measurement device 3 is installed in public facilities such as a station and an airport or in stores such as a rental car shop and a major home electronics retailer, so that an unspecified number of people are able to use the device (so as to measure the operation handling ability).

The person and machine matching device 1, for each operator of which the characteristic value related to the machine operation handling ability has been input from the operation handling ability measurement device 3, identifies an operator type classified on the basis of an input characteristic value related to the machine operation handling ability. In addition, the person and machine matching device 1, for each operator of which the characteristic value related to the machine operation handling ability has been input from the operation handling ability measurement device 3, generates an operator type record in which an identification of the operator (registrant ID) and an operator type are associated with each other and registers the operator type record in the database. The person of which the operator type record is registered in the database is a registrant as referred to in the preferred embodiment (the person of which the operator type record is not registered in the database is a non-registrant).

The terminal 4 is a personal computer, a smart phone, and the like that a registrant owns. The registrant, by operating the terminal 4, is able to make a request to the person and machine matching device 1, for example, for presenting a machine that matches the operation handling ability of the registrant. The registrant as referred to in the present preferred embodiment is a person of which the operator type record obtained by measuring the operation handling ability by the operation handling ability measurement device 3 as described above is registered in the database. The registrant ID is added to the registrant.

It is to be noted that FIG. 1 simply illustrates one operating characteristic measurement device 2, one operation handling ability measurement device 3, and one terminal 4 each of which is connected to the person and machine matching device through a network. The operating characteristic measurement device 2, the operation handling ability measurement device 3, and the terminal 4 that are connected to the person and machine matching device 1 through a network may be two or more.

Figure 2:
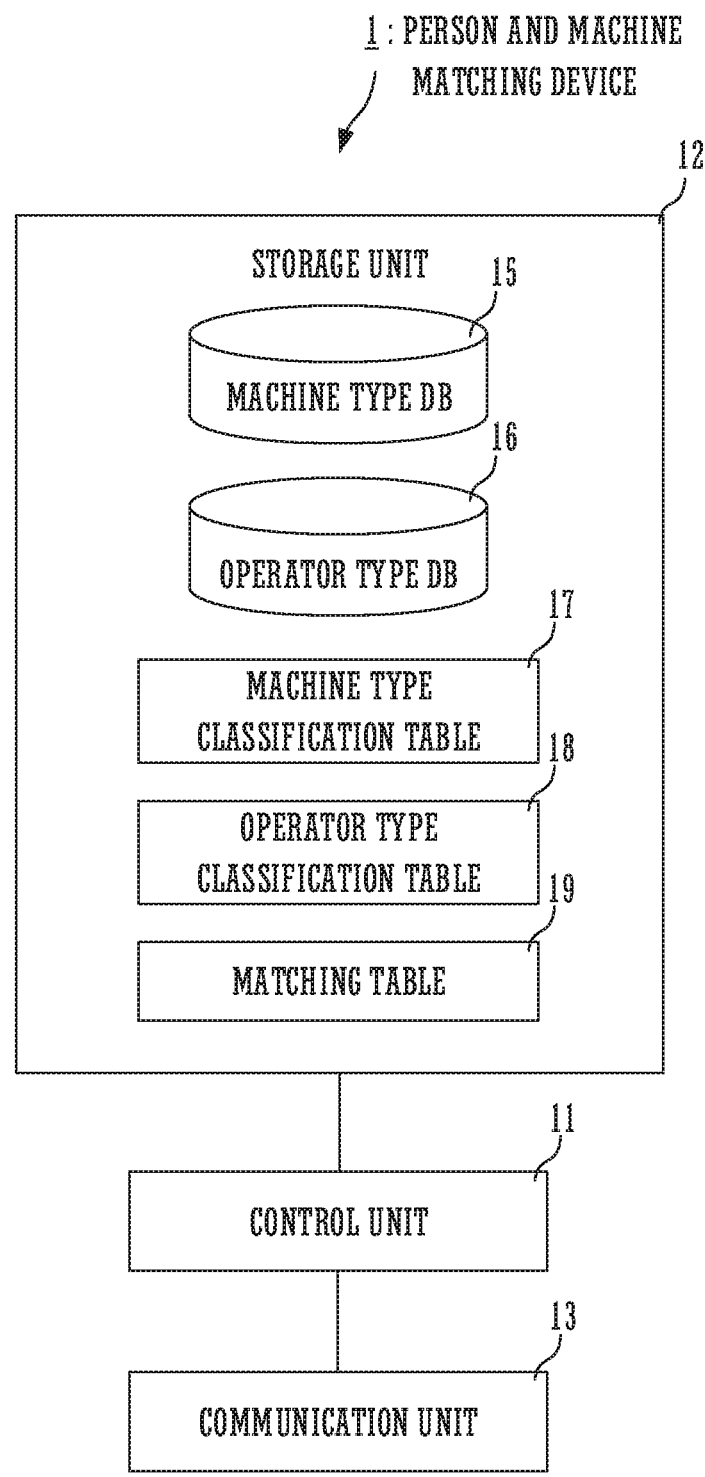
FIG. 2 is a block diagram illustrating a configuration of a main portion of a person and machine matching device.

FIG. 2 is a block diagram illustrating a configuration of a main portion of a person and machine matching device. The person and machine matching device 1 is provided with a control unit 11, a storage unit 12, and a communication unit 13.

The control unit 11 controls the operation of various portions of the main body of the person and machine matching device 1 and executes a process such as a machine type identification process to identify a machine type, an operator type identification process to identify an operator type, a matching determination process to determine matching between a machine and an operator, and a matching determination result information generation process to generate matching determination result information on the basis of the result of the matching determination process. The control unit 11 is configured to be equivalent to a machine type identification unit, an operator type identification unit, a matching determination unit, and a matching determination result information generation unit according to the present invention.

The storage unit 12 has a storage medium such as a hard disk and stores a machine type database 15 (machine type DB 15), an operator type database 16 (operator type DB 16), a machine type classification table 17, an operator type classification table 18, and a matching table 19.

The machine type DB 15 is a database in which the above described machine type record (a record in which a machine ID, a manufacturer, a model name, and a machine type are associated with each other) is registered. The operator type DB 16 is a database in which the above described operator type record (a record in which a registrant ID and an operator type are associated with each other) is registered. The machine type classification table 17 is a table used for identifying a machine type of a machine of which the characteristic value related to the operability of the machine has been input from the operating characteristic measurement device 2. The operator type classification table 18 is a table used for identifying an operator type of an operator of which the characteristic value related to the operation handling ability has been input from the operation handling ability measurement device 3. The matching table 19 is a table used for determining matching between the machine type and the operator type.

FIG. 3 illustrates a data structure of a machine type classification table according to the preferred embodiment of the present invention. The machine type classification table 17 according to the preferred embodiment of the present invention is a table in which a machine type is classified into one of six types of "a machine for display," "a machine for a specific customer," "a machine for school education," "a machine for a research institution," "a machine for an elderly person," and "a machine for professional use". The name of a machine type is determined for convenience of description, and, does not mean that, for example, the application of the machine of which the machine type is classified into "a machine for display" is limited to display. Even when the machine is a machine such as a vehicle or a personal computer that a general user uses, the machine type of the machine is classified into "a machine for display" according to the operability of the machine. The name of the machine type may be another name such as Type A and Type B.

In addition, each machine type is determined by three levels (large, medium, small) of the size of the range to be handled by an operator in operation with respect to seven items (hereinafter, the items may also be referred to as characteristic items) of "the position and size of a screen" and "the size and type of a letter" related to the operating characteristics of a visual interface, "a fingertip," "a grip," and "rotation, push-pull" related to the operating characteristics of dynamic operation, and "the amount and depth of necessary knowledge" and "the complexity of operation" related to the operating characteristics of information understanding.

The person and machine matching device 1 determines the size of the range to be handled by an operator the operation of each of the characteristic items on the basis of a characteristic value related to operability, the characteristic value having been input from the operating characteristic measurement device 2. The person and machine matching device 1 identifies a machine type according to the combination of the size of the range to be handled by an operator in the operation, the size having been determined with respect to each of the characteristic items.

In the preferred embodiment of the present invention, the machine type includes six types, as described above. On the other hand, since the person and machine matching device 1 determines the size of the range to be handled by an operator by the three levels with respect to each of the characteristic items (seven items), the total number of combinations of a determination result is 2187, which is far more than the machine types (six types). Thus, there is a high possibility that the machine type that completely matches the combination of the size of the range to be handled by an operator in the operation of each of the characteristic items, the combination having been determined on the basis of the characteristic value related to operability, the characteristic value having been input from the operating characteristic measurement device 2, is not registered in the machine type classification table 17.

If the machine type that completely matches the combination of the size of the range to be handled by an operator in the operation of each of the characteristic items, the combination having been determined on the basis of the characteristic value related to operability, the characteristic value having been input from the operating characteristic measurement device 2 is not registered in the machine type classification table 17, the person and machine matching device 1, using technology such as known fuzzy inference, classifies the machine type into one of the six types registered in the machine type classification table 17. In other words, the person and machine matching device 1 classifies the machine of which the characteristic value related to the operability has been input from the operating characteristic measurement device 2, into one of the six types registered in the machine type classification table 17.

FIG. 4 illustrates a data structure of an operator type classification table according to the preferred embodiment of the present invention. This operator type classification table 18 is a table in which an operator type is classified into one of six types of "an unskilled young person," "an unskilled elderly person," "a child," "an enthusiastic child," "an enthusiastic elderly person," and "a skilled young person". It is to be noted that the name of an operator type, like the name of the above described machine type, is determined for convenience of description, and, does not mean that, for example, the operator of which the operator type is classified into "an unskilled young person" does not include a child or an elderly person. The name of the operator type may be another name such as Type a and Type b.

In addition, each operator type is determined by three levels (large, medium, small) of the size of the handling ability of an operator, related to the operation, with respect to seven items (hereinafter, the items may also be referred to as characteristic items) of "the position and size of a screen" and "the size and type of a letter" related to the operation handling ability of a visual interface, "a fingertip," "a grip," and "rotation, push-pull" related to the operation handling ability of dynamic operation, and "the amount and depth of necessary knowledge" and "the complexity of operation" related to the operation handling ability of information understanding.

The person and machine matching device 1 determines the size of the operation handling ability of an operator with respect to each of the characteristic items on the basis of a characteristic value related to a machine operation handling ability, the characteristic value having been input from the operation handling ability measurement device 3. The person and machine matching device 1 identifies an operator type according to the combination of the size of the handling ability of an operator, related to the operation, the size having been determined with respect to each of the characteristic items.

In the preferred embodiment of the present invention, the operator type includes six types, as described above. On the other hand, since the person and machine matching device 1 determines the size of the handling ability of an operator by the three levels with respect to each of the characteristic items (seven items), the total number of combinations of a determination result is 2187, which is far more than the operator types (six types). Thus, there is a high possibility that the operator type that completely matches the combination of the size of the handling ability of an operator, related to the operation of each of the characteristic items, the combination having been determined on the basis of the characteristic value related to the machine operation handling ability, the characteristic value having been input from the operation handling ability measurement device 3 is not registered in the operator type classification table 18.

If the operator type that completely matches the combination of the size of the handling ability of an operator, related to the operation of each of the characteristic items, the combination having been determined on the basis of the characteristic value related to the machine operation handling ability, the characteristic value having been input from the operation handling ability measurement device 3, is not registered in the operator type classification table 18, the person and machine matching device 1, using technology such as known fuzzy inference, classifies the operator type into one of the six types registered in the operator type classification table 18. In other words, the person and machine matching device 1 classifies the operator of which the characteristic value related to an operation handling ability has been input from the operation handling ability measurement device 3, into one of the six types registered in the operator machine type classification table 18.

FIG. 5 illustrates a data structure of a matching table according to the preferred embodiment of the present invention. The matching table 19 is a table in which a matching relationship between the machine type and the operator type is registered. In FIG. 5, "o" indicates that the machine type and the operator type are matched, and "x" indicates that the machine type and the operator type are not matched. In addition, "?" indicates that whether or not the machine type and the operator type are matched is unknown (some operators may be matched and other operators may not be matched). The matching table 19 shown in FIG. 5 includes, for example, a registration in which a machine being "a machine for display" matches an operator of which the operator type is "an unskilled young person," "an enthusiastic child," and "an enthusiastic elderly person" and does not match an operator of which the operator type is "an unskilled elderly person," "a child," and "a skilled young person". In addition, the matching table 19 includes a registration in which an operator of which the operator type is "an unskilled young person" matches a machine of which the machine type is "a machine for display," and does not match a machine being "a machine for a program". The matching table 19 also includes a registration in which whether or not an operator of which the operator type is "an unskilled young person" matches a machine of which the machine type is "a machine for a specific customer," "a machine for school education," "a machine for a research institute," and "a machine for an elderly person" is unknown.

The communication unit 13 performs data communication between the operating characteristic measurement device 2, the operation handling ability measurement device 3, and the terminal 4 that are connected through the network.

Figure 6:
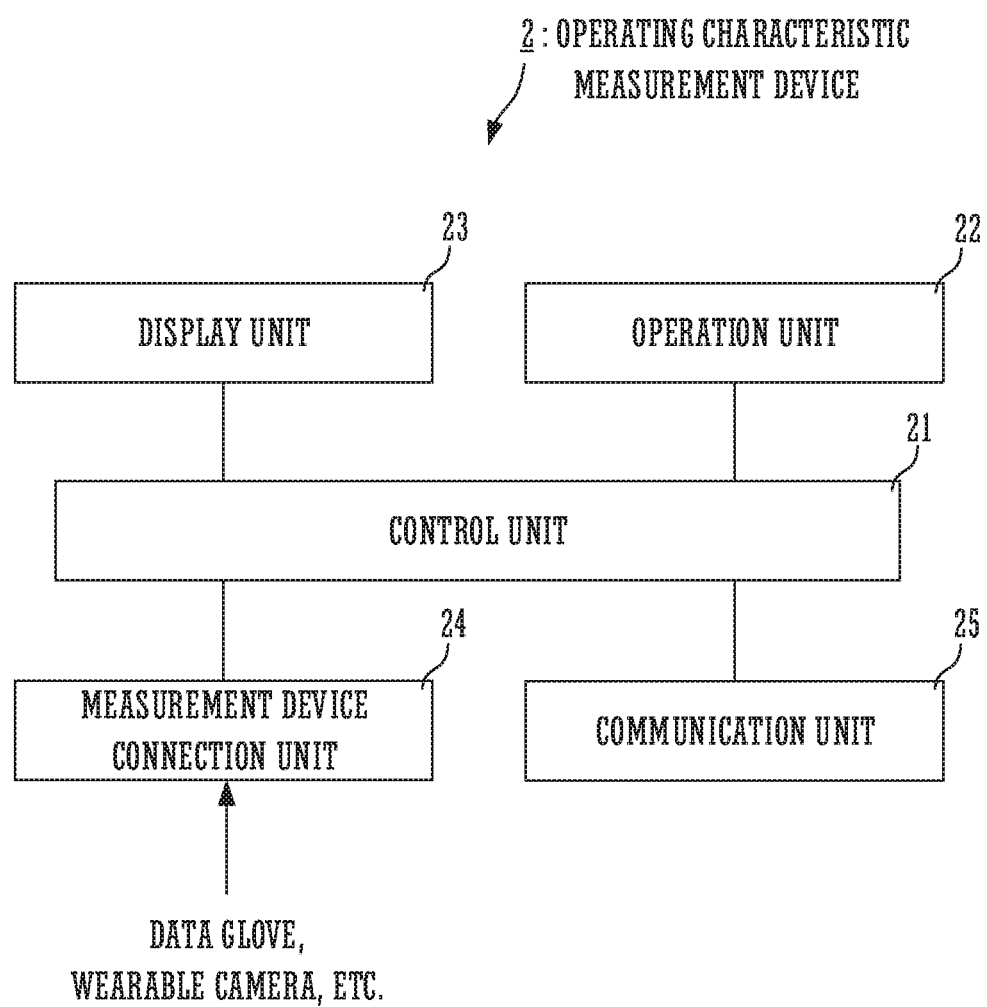
FIG. 6 is a block diagram illustrating a configuration of a main portion of an operating characteristic measurement device.

FIG. 6 is a block diagram illustrating a configuration of the main portion of an operating characteristic measurement device. The operating characteristic measurement device 2 is provided with a control unit 21, an operation unit 22, a display unit 23, a measurement device connection unit 24, and a communication unit 25.

The control unit 21 controls the operation of various portions of the main body of the operating characteristic measurement device 2.

The operation unit 22 is provided with input devices such as a keyboard and a mouse, and receives an input operation to the main body of the operating characteristic measurement device 2.

The display unit 23 has a display device and mainly displays a manual of a machine of which the characteristic value related to the operability is to be measured.

Figure 7:
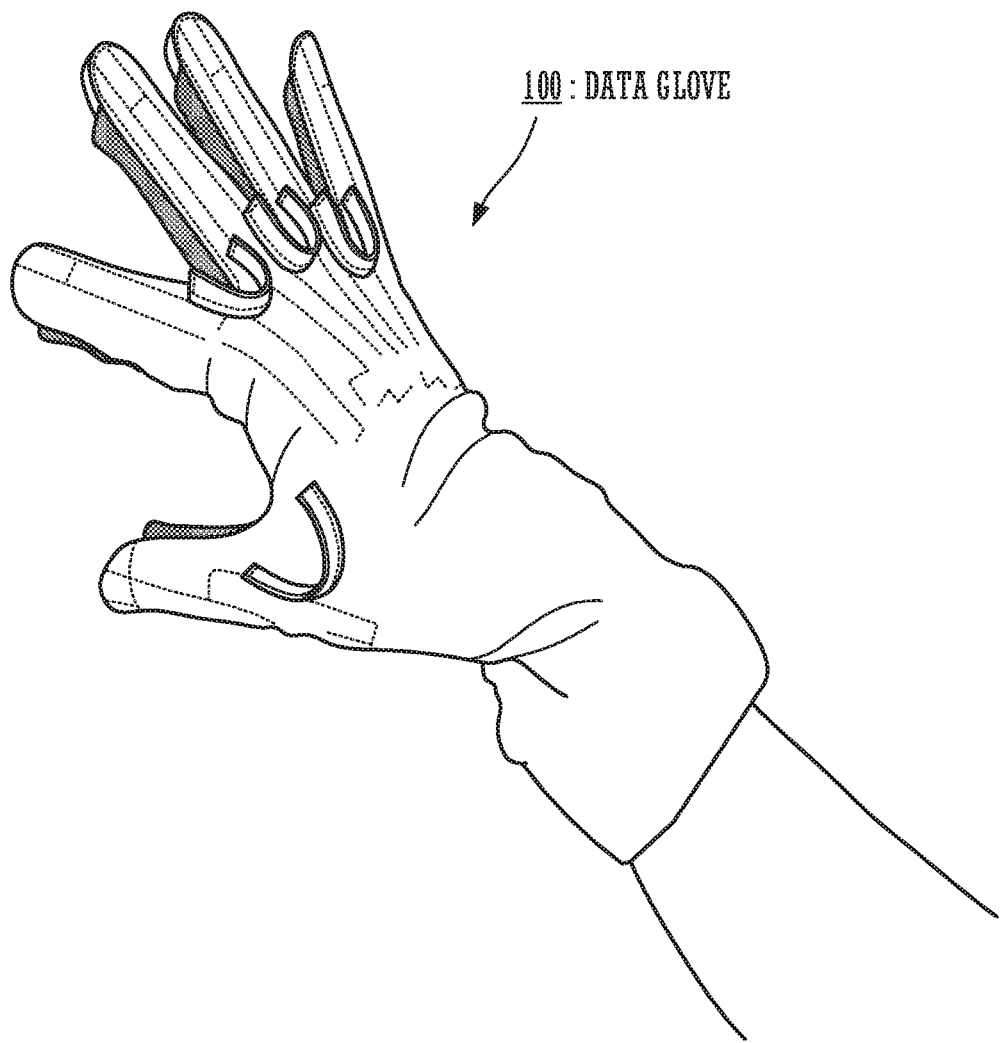
FIG. 7 is a view of a data glove.
Figure 8:
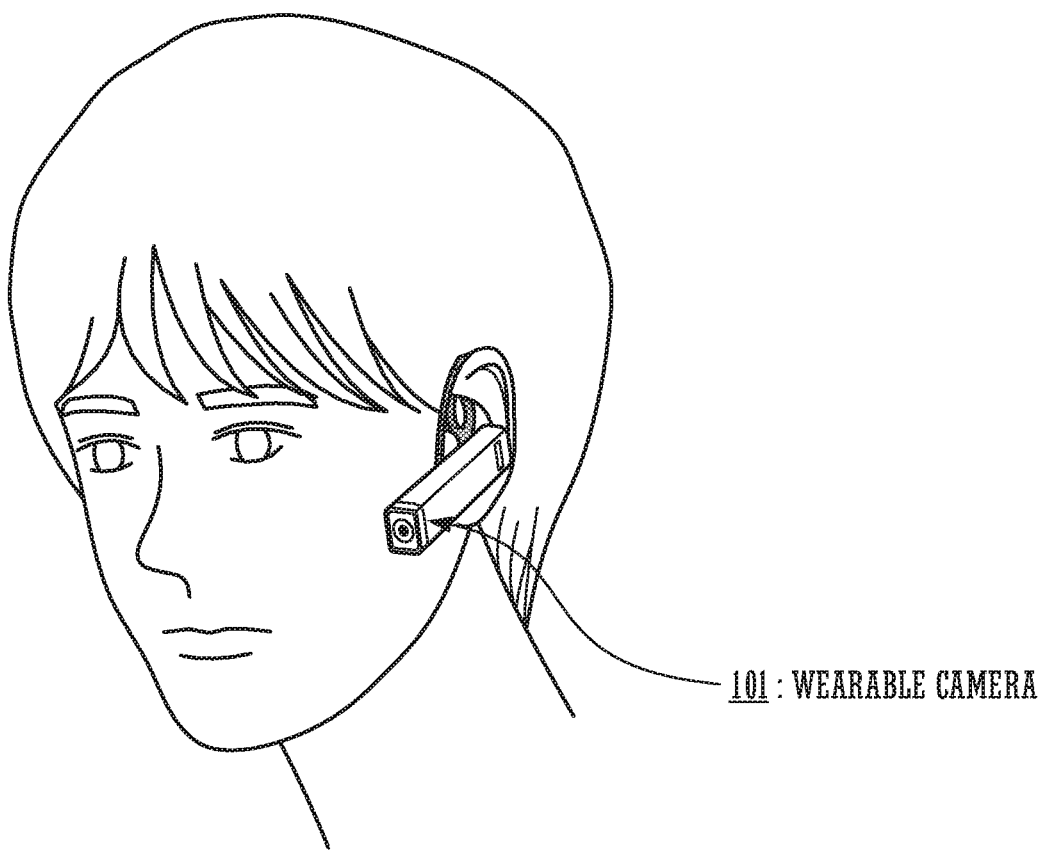
FIG. 8 is a view of a wearable camera.

The measurement device connection unit 24 is connected to measurement devices such as a data glove and a wearable camera. FIG. 7 is a view of a data glove and FIG. 8 is a view of a wearable camera.

The data glove 100 is a measurement device (sensing device) that, using resistive bend-sensing technology, detects a motion of the hand or finger of the operator who wears the data glove and outputs data such as a joint angle. Examples of the data glove 100 include a data glove that has been developed by CyberGlove Systems LLC (see http://www.nihonbinary.co.jp/Products/VR/MotionCapture/cyberglove.html).

The data glove 100 provided with a large number of sensors and detects the bending of each finger the recurving of each finger, the bending of a palm, the recurving of a palm, and the like, as a motion of a hand and a finger. The data glove 100 is provided with a sensor that detects the bending of a finger by an optical fiber, a resistive element, or the like, or a sensor (sensor of a motion tracker, such as a magnetic sensor and an inertia sensor) that detects an absolute position of a hand and posture data, for example. The data glove 100 converts the motion of the hand or finger of a detected operator (wearer) into digital data and outputs the digital data.

In addition, the wearable camera 101 is a small video camera capable of being used to be attached to an ear, a hat, or the like (see http://trendy/nikkeibp.co.jp/particle/column/20120726/1042136/?P=1). The wearable camera 101 outputs a captured image.

An operator captures an image by the wearable camera 101 while operating the machine of which the characteristic value related to the operability is to be measured, with a hand wearing the data glove 100. The measurement device connection unit 24 processes the motion of the hand or finger of the operator that has been detected with the data glove 100 or the image that has been captured by the wearable camera 101, and then acquires a characteristic value related to operability. The measurement device connection unit 24 processes the captured image of the wearable camera 101 when an operator traces the outline of an operating part with a fingertip, for example, and measures the size and height of the operating part from the locus of the fingertip. The imaging magnification of the wearable camera 101 is able to be calculated from the size of the captured image of the fingertip of the data glove 100, for example.

In addition, the measurement device connection unit. 24, with respect to each operating part, measures the amount of force necessary for operation, an operation speed, the accuracy of operation, and the like, by processing the output (motion of the hand and finger of an operator) of the data glove 100. In addition, an operator inputs the success of the operation of an operating part, to the operating characteristic measurement device 2, by making the wearable camera 101 capture a predetermined specific hand gesture such as a V sign.

The communication unit 25 performs data communication with the person and machine matching devices 1 that is connected through the network.

It is to be noted that the operating characteristic measurement device 2, while being configured to be connected to the person and machine matching device 1 through a network in the preferred embodiment, may be configured to be built in the person and machine matching device 1.

Figure 9:
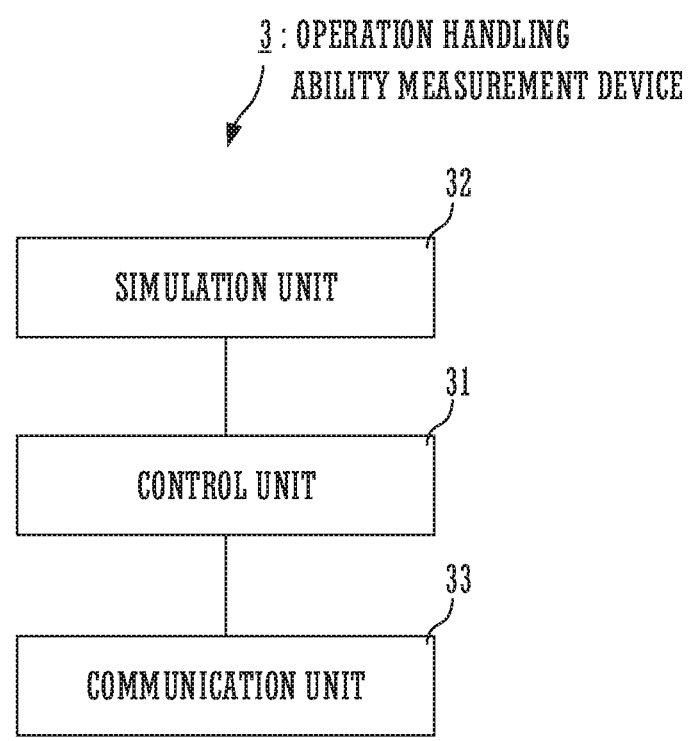
FIG. 9 is a diagram illustrating a configuration of a main portion of an operation handling ability measurement device.

FIG. 9 is a diagram illustrating a configuration of the main portion of an operation handling ability measurement device. The operation handling ability measurement device 3 is provided with a control unit 31, a simulation unit 32, and a communication unit 33.

The control unit 31 controls the operation of various portions of the main body of the operation handling ability measurement device 3.

Figure 10:
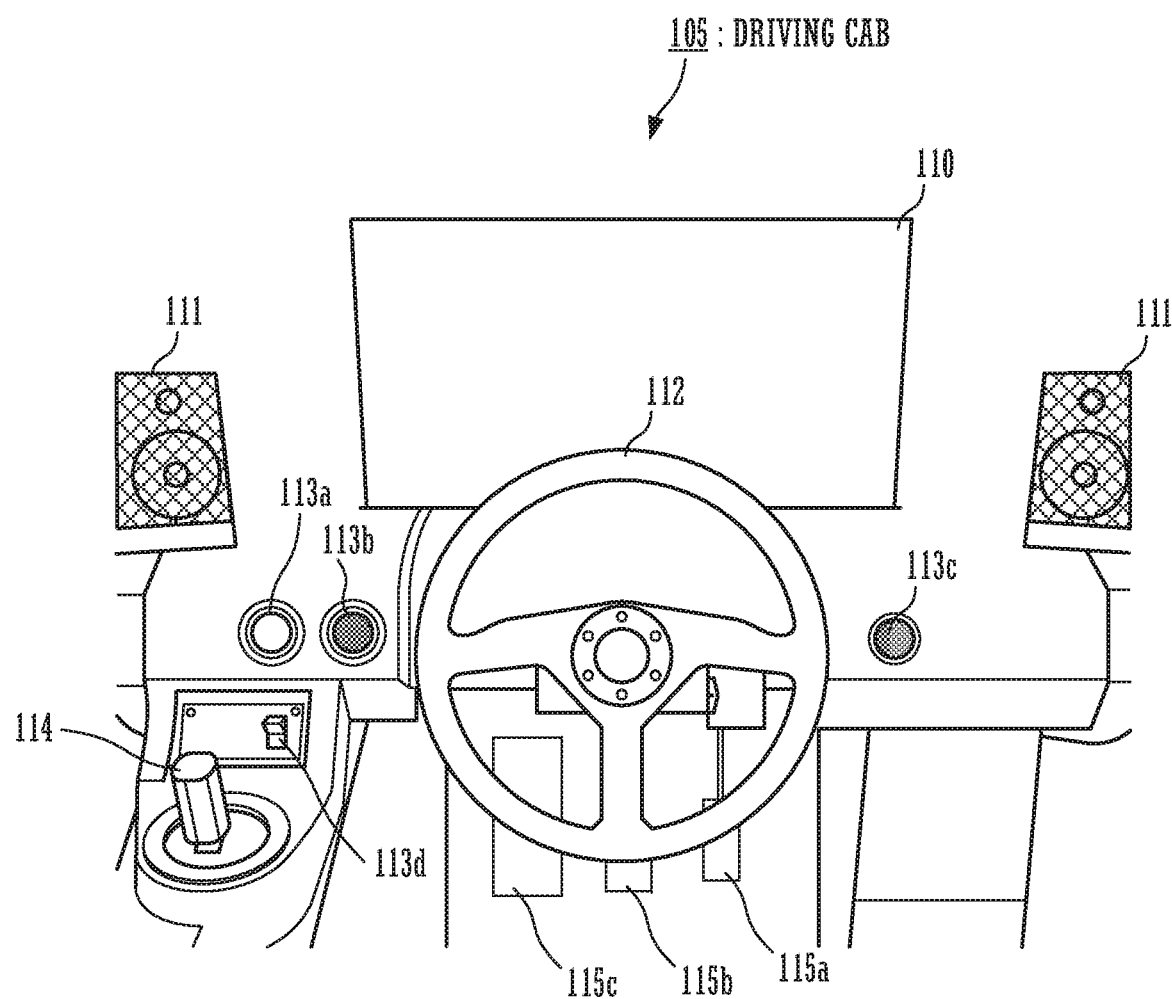
FIG. 10 is a schematic view of a driving cab.

The simulation unit 32 is provided with a driving cab 105 in which a simulation of the operation of a vehicle is run. FIG. 10 is a schematic view of the driving cab.

The driving cab 105 is provided with a display device 110, a speaker 111, a handle 112, a manual operation button 113 (113a to 113d), a shift lever 114, an operating pedal 115 (115a to 115c), and other equipment, in front of an operator who sits in a non-illustrated driver seat. The height of the non-illustrated driver seat is able to be changed. In addition, the size of the letter displayed on the display device 110 and the size (volume) of the sound output from the speaker 111 can also be changed. The force necessary for the operation of the handle 112, the shift lever 114, and the operating pedal 115 can also be changed. The driving cab 105 is provided with a brake mechanism for the handle 112, the shift lever 114, and the operating pedal 115, for example, and configured to change the force necessary for operation by operating the brake mechanism.

The simulation unit 32 provides operating instructions of the handle 112, the manual operation button 113, the shift lever 114, the operating pedal 115, and other equipment to the operator who sits in the driver seat. The operating instructions are performed by a display on the display device 110 or a sound output from the speaker 111 on the basis of a simulation program. The simulation unit 32 detects the operation of the operator to the operating instructions.

In addition, the simulation unit 32, by detecting the operation of the operator to the operating instructions while changing the operating environment of the operator on the basis of the simulation program, measures a characteristic value related to the operation handling ability of a visual interface, the operation handling ability of dynamic operation, and the operation handling ability of information understanding.

For example, the simulation unit 32 changes the operating environment of the operator as follows.

(1) The simulation unit 32 changes the size of the letter displayed on the display device 110 or the size (volume) of the sound output from the speaker 111 according to the operating instructions, on the basis of the simulation program.

(2) The simulation unit 32 changes the necessary for operation of the handle 112, the manual operation button 113, the shift lever 114, the operating pedal 115, and other equipment, on the basis of the simulation program.

(3) The simulation unit 32 changes the height of the driver seat on the basis of the simulation program.

In addition, the simulation unit 32 may provide the operator with the operating instructions of a single operating part or may continuously provide the operator with the operating instructions of a plurality of operating parts.

The communication unit 33 performs data communication with the person and machine matching devices 1 that is connected through the network.

Hereinafter, a description will be given of the operation of the matching system.

Figure 11:
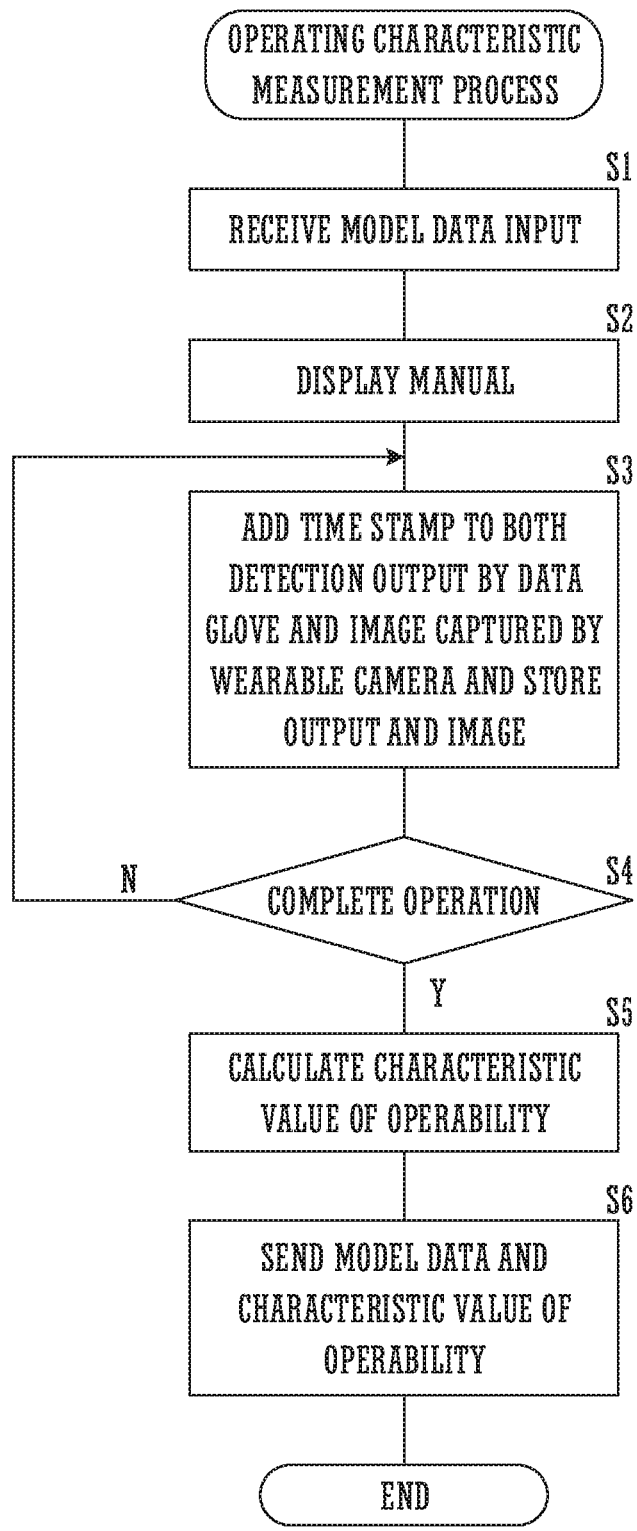
FIG. 11 is a flow chart of an operating characteristic measurement process.

To begin with, a description will be given of a process (operating characteristic measurement process) in which the operating characteristic measurement device 2 measures a characteristic value related to the operability of a machine. FIG. 11 is a flow chart of the operating characteristic measurement process.

In the preferred embodiment, the operating characteristic measurement device 2 measures the following items as a characteristic value related to the operability of a machine.

1. Operating Characteristics of Visual Interface
1.1 Size, Installation Height, and Display Brightness of Screen
1.2 Size, Color, and Contrast of Letter and Drawing to be Displayed
2. Operating Characteristics of Dynamic Operation
2.1 Operating Characteristics in Fingertip Operation
2.1.1 Size and Height of Part (Button, Dial, and Lever, for example) to be Operated with Fingertip
2.1.2 Size of Force Necessary for Operation of Part to be Operated with Fingertip
2.1.3 Operation Accuracy and Operation Speed Necessary for Operation of Part to be Operated with Fingertip
2.2 Operating Characteristics in Grip Operation
2.2.1 Size and Height of Part to be Operated with Grip
2.2.2 Size of Force Necessary for Operation of Part to be Operated with Grip
2.2.3 Operation Accuracy and Operation Speed Necessary for Operation of Part to be Operated with Grip
2.3 Operating Characteristics in Operation of Rotation and Push-Pull
2.3.1 Size and Height of Part to be Operated in Rotation and Push-Pull
2.3.2 Size of Force Necessary for Operation of Part to be Operated in Rotation and Push-Pull
2.3.3 Operation Accuracy and Operation Speed Necessary for Operation of Part to be Operated in Rotation and Push-Pull
3. Operating Characteristics of Information Understanding
3.1 Field and Amount of Knowledge Necessary for Operation
3.2 Degree of Complexity of Operating Procedure (the Number of Steps and the Number of Branches)
3.3 Number of Parts to be Operated Simultaneously
3.4 Number of Evaluation indexes to be Adjusted Simultaneously, and Number of Couplings and Coupling Strength between Evaluation Indexes In addition, as described above, the operation of a machine is performed by an operator who wears the data glove 100 or the wearable camera 101.

To begin with, the operator, with respect to a machine of which the characteristic value related to the operability is to be measured, operates the operation unit 22, and inputs the code indicating the large classification of the machine (code indicating a vehicle, a television, a personal computer, a smart phone, and the like), the manufacturer of the machine, and the model name of the machine, as model data, to the operating characteristic measurement device 2.

The operating characteristic measurement device 2, when receiving the input of the model data (s1), on the basis of the input model data, reads the manual of the machine and displays the manual on the display device of the display unit 23 (s2). The operating characteristic measurement device 2 may be configured to display a manual stored in a recording medium such as a hard disk, or may be configured to download and display a manual publicly available on a network such as the Internet. The operator operates the machine, looking at the displayed manual. The operator wears a measurement device such as the data glove 100 or the wearable camera 101.

It is to be noted that the operating characteristic measurement device 2 may not have a function to display a manual. In such a case, the operator may operate the machine, looking at a manual printed on paper.

The operating characteristic measurement device 2, when the operator starts the operation of the machine, adds a time stamp to the detection output of the data glove 100 and the captured image of the wearable camera 101 that have been input to the measurement device connection unit 24 and stores the detection output and the captured image (s3). The time stamp associates the detection output of the data glove 100 with the captured image of the wearable camera 101.

In addition, the operator, when the operation described in the manual ends for each function, makes the wearable camera 101 capture a specific hand gesture such as a V sign. Accordingly, the operating characteristic measurement device 2 is able to determine, for each function, the end timing of the operation related to a function from the captured image of the wearable camera 101. In other words, the operating characteristic measurement device 2 is able to divide a series of input captured images of the wearable camera 101, into images from the start of the operation to the end of the operation for each function.

In addition, the operator traces the outer periphery of the operating parts such as a handle, a lever, a button, and a pedal, with a fingertip of the hand wearing the data glove 100. The operating characteristic measurement device 2 acquires the appearance of each of the operating parts from the image captured by the wearable camera 101 at such a time.

The operating characteristic measurement device 2, when the operation of the machine by the operator finishes (s4), calculates a characteristic value related to the operability of each of the above described items (1.1 Size, Installation Height, and Display Brightness of Screen; 1.2 Size, Color, and Contrast of Letter and Drawing to be Displayed; 2.1.1 Size and Height of Part (Button, Dial, and Lever, for example) to be Operated with Fingertip; 2.1.2 Size of Force Necessary for Operation of Part to be Operated with Fingertip; 2.1.3 Operation Accuracy and Operation Speed Necessary for Operation of Part to be Operated with Fingertip; 2.2.1 Size and Height of Part to be Operated with Grip; 2.2.2 Size of Force Necessary for Operation of Part to be Operated with Grip; 2.2.3 Operation Accuracy and Operation Speed Necessary for Operation of Part to be Operated with Grip; 2.3.1 Size and Height of Part to be Operated in Rotation and Push-Pull; 2.3 Size of Force Necessary for Operation of Part to be Operated in Rotation and Push-Pull; 2.3.3 Operation Accuracy and Operation Speed Necessary for Operation of Part to be Operated in Rotation and Push-Pull; 3.1 Field and Amount of Knowledge Necessary for Operation; 3.2 Degree of Complexity of Operating Procedure (the Number of Steps and the Number of Branches); 3.3 Number of Parts to be Operated Simultaneously; 3.4 Number of Evaluation Indexes to be Adjusted Simultaneously, and Number of Couplings and Coupling Strength between Evaluation Indexes) of the machine (s5). In Step s5, the characteristic value related to each of the above described items is calculated on the basis of a predetermined rule, using the detection output of the data glove 100 stored in Step s3 and the captured image of the wearable camera 101. For example, the characteristic value of the operability of a visual interface is calculated mainly from the size of a display device, the size of a displayed letter, and the display density of a letter. In addition, the characteristic value of the operability of dynamic operation is calculated mainly from the size of a manual operation button, the relative positional relationship of manual operation buttons, and force necessary for operation. In addition, the characteristic value of the operability of information understanding is calculated mainly from the complexity of operation (such as the number of operation steps) in a series of operations related to each function.

The operating characteristic measurement device 2 sends the model data that has been input in Step s1 and the characteristic value related to the operability of each item that has been calculated in Step s5, to the person and machine matching device 1 (s6).

It is to be noted that the process related co Step s6 may be a process of recording such data in recording media such as a CD or an SD card. In such a case, the person and machine matching device 1 may be equipped with the recording media in which the characteristic value related to operability is recorded and read a recorded characteristic value related to operability.

Figure 12:
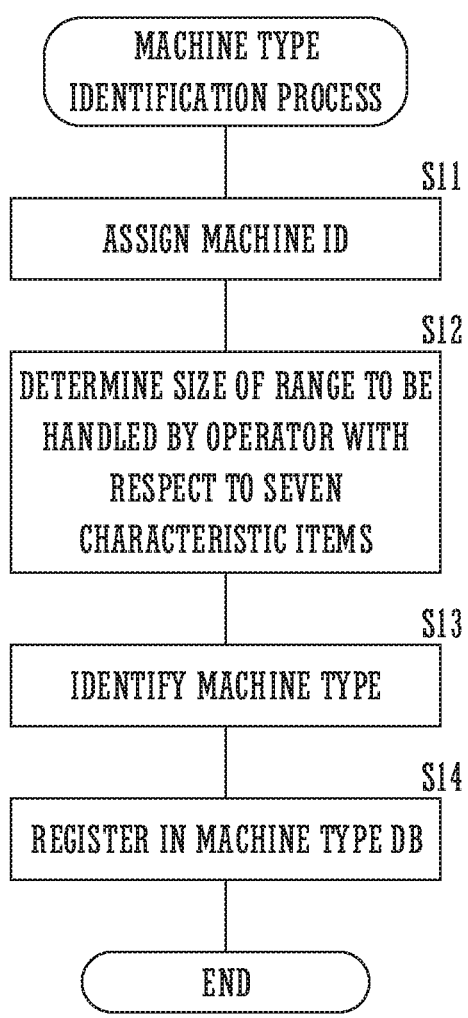
FIG. 12 is a flow chart of a machine type identification process.

Subsequently, a description will be given of a process (machine type identification process) in which the person and machine matching device 1 identifies a machine type from the characteristic value related to the operability of a machine, the characteristic value having been measured by the operating characteristic measurement device 2. FIG. 12 is a flow chart of the machine type identification process.

The person and machine matching device 1, as described above, stores the machine type classification table 17 shown in FIG. 3.

The person and machine matching device 1 adds a machine ID to a machine of which the machine type is to be identified this time (s11). In the preferred embodiment, in order to prevent the same machine ID from being added to a plurality of machines, the person and machine matching device 1 is configured to add a machine ID (the operating characteristic measurement device 2 is configured not to add a machine ID).

The person and machine matching device 1, with respect to a machine of which the machine type is to be identified this time, determines which of the three levels of large, medium, and small is the size of the range to be handled by an operator in operation, with respect to the seven characteristic items of "the position and size of a screen" and "the size and type of a letter" related to the operating characteristics of a visual interface, "a fingertip," "grip," and "rotation, push-pull" related to the operating characteristics of dynamic operation, and "the amount and depth of necessary knowledge" and "the complexity of operation" related to the operating characteristics of information understanding (s12). In Step s12, with respect to the machine of which the machine type is to be identified this time, the size of the range to be handled by an operator in operation is determined by the three levels of large, medium, and small, from the characteristic value of each of the above described items that has been input from the operating characteristic measurement device 2, for each of the above described seven characteristic items.

The person and machine matching device 1 stores the machine type classification table shown in FIG. 3. The person and machine matching device 1 identifies a machine type (s13) according to the combination of the size of the range to be handled by an operator in the operation, the size having been determined with respect to each of the characteristic items in Step s12.

The machine type, in the preferred embodiment, includes six types, as described above. Since the person and machine matching device 1, in Step s12, determines the size of the range to be handled by an operator by the three levels with respect to each of the characteristic items (seven items), the total number of combinations of a determination result is 2187, which is far more than the machine types (six types). Thus, there is a high possibility that the combination of the size of the range to be handled by an operator in the operation of each of the characteristic items, the combination having been determined on the basis of the characteristic value related to operability, the characteristic value having been input from the operating characteristic measurement device 2 does not completely match any of the machine types registered in the machine type classification table 17. The person and machine matching device 1, with respect to the machine of which the combination of the size of the range to be handled by an operator in the operation of each of the characteristic items, the size having been determined in Step s12, does not completely match any of the machine types registered in the machine type classification table 17, identifies one of the machine types registered in the machine type classification table 17, using technology such as known fuzzy inference.

The person and machine matching device 1 generates a record in which the machine ID added in Step s11, the manufacturer, the model name, and the machine type identified in Step s13 are associated with each other, and registers the record in the machine type DB 15 (s14).

Accordingly, a record of the machine of which the characteristic value of each item related to operability has been measured by the operating characteristic measurement device 2 is registered in the machine type DB 15, the record including the machine ID, the manufacturer, the model name, and the machine type that are associated with each other. In addition, since the characteristic value of each item related to operability for each machine is calculated from measurement data acquired when an operator actually operates the machine, the machine type of the machine is able to be determined with high accuracy.

Subsequently, a description will be given of a process (operation handling ability measurement process) in which a characteristic value related to the machine operation handing ability of an operator (user) is measured. The operation handling ability measurement device 3 performs the process.

Figure 13:
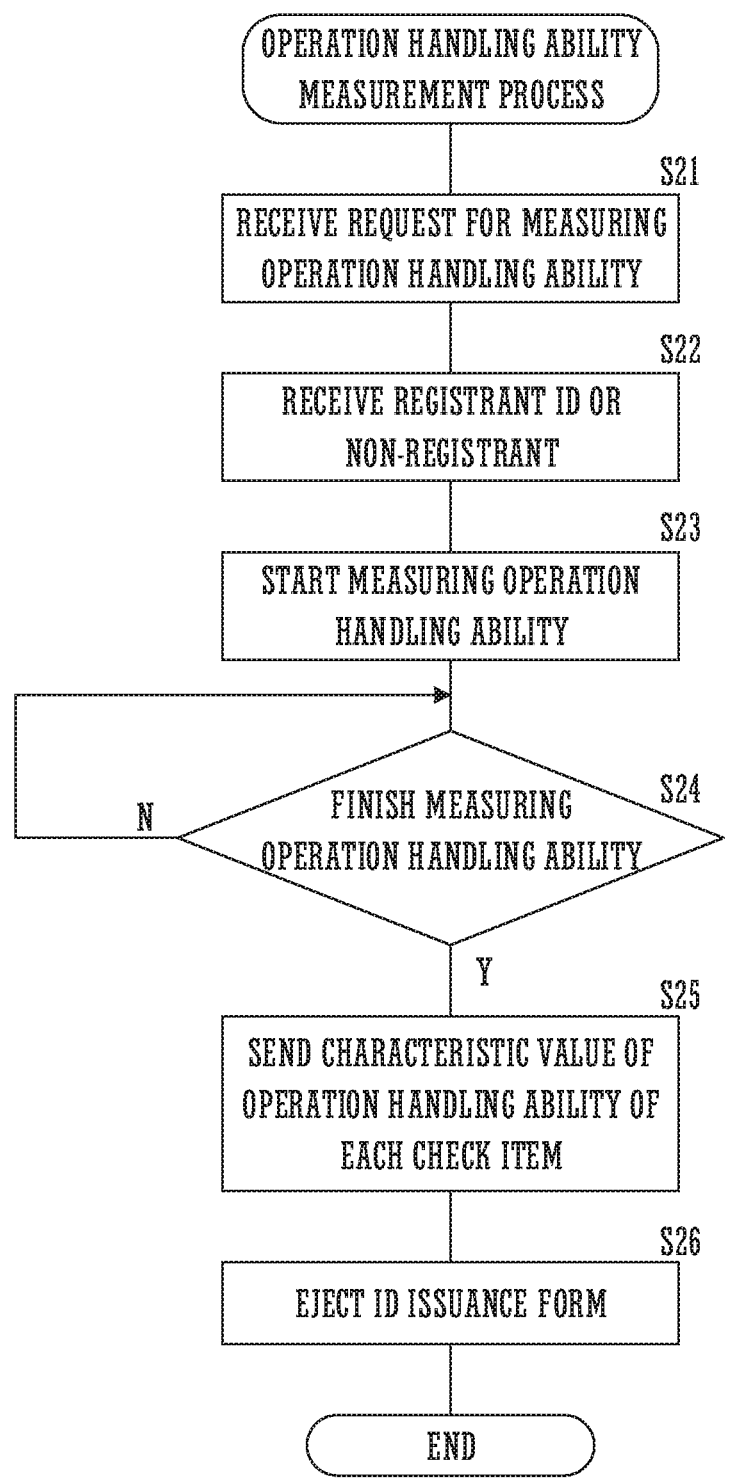
FIG. 13 is a flow chart of an operation handling ability measurement process.

FIG. 13 is a flow chart of the operation handling ability measurement process. An operator sits in the driver seat of the driving cab 105, and performs an input operation related to start of measurement of an operation handling ability.

The operation handling ability measurement device 3, when receiving an input operation related to a request for measurement of the operation handling ability (s21), receives a registrant ID or an input operation related to new registration (s22). Step s22 is a process for preventing a plurality of registrant IDs from being added to the same person by identifying whether an operator of which the characteristic value related to the operation handling ability is to be measured this time is a registrant or an unregistered person.

The operation handling ability measurement device 3 executes the stored simulation program, and starts measurement of the operation handling ability (s23). The operation handling ability measurement device 3, by executing the simulation program, displays operating instructions (operating instructions of the handle 112, the manual operation button 113, the shift lever 114, the operating pedal 115, and other equipment) to the operator, on the display device 110. In addition, the operation handling ability measurement device 3 changes the operation situation of the operator by changing the amount of force necessary to move the driver seat up and down or to rotate the handle 112 or by changing the amount of force necessary to operate the operating pedal 115. In addition, the operation handling ability measurement device 3 also executes the operating instructions to cause a plurality of operations to be executed as a series of operations. The operation handling ability measurement device 3 also changes a sound output (volume) from the speaker 111 or changes the size of a letter to be displayed on the display device 110.

The simulation program is a program to measure a characteristic value of the operation handling ability of an operator who sits in the driving cab 105, with respect to predetermined check items. The check items are the same as the above described items (1.1 Size, Installation Height, and Display Brightness of Screen; 1.2 Size, Color, and Contrast of Letter and Drawing to be Displayed; 2.1.1 Size and Height of a Part (Button, Dial, and Lever, for example) be Operated with Fingertip; 2.1.2 Size of Force Necessary for Operation of Part to be Operated with Fingertip; 2.1.3 Operation Accuracy and Operation Speed Necessary for Operation of Part to be Operated with Fingertip; 2.2.1 Size and Height of Part to be Operated with Grip; 2.2.2 Size of Force Necessary for Operation of Part to be Operated with Grip; 2.2.3 Operation Accuracy and Operation Speed Necessary for Operation of Part to be Operated with Grip; 2.3.1 Size and Height of Part to be Operated in Rotation and Push-Pull; 2.3.2 Size of Force Necessary for Operation of Part to be Operated in Rotation and Push-Pull; 2.3.3 Operation Accuracy and Operation Speed Necessary for Operation of Part to be Operated in Rotation and Push-Pull; 3.1 Field and Amount of Knowledge Necessary for Operation; 3.2 Degree of Complexity of Operating Procedure (the Number of Steps and the Number of Branches); 3.3 Number of Parts to be Operated Simultaneously; 3.4 Number of Evaluation Indexes to be Adjusted Simultaneously, and Number of Couplings and Coupling Strength between Evaluation Indexes) to be measured as a characteristic value related to the operability of a machine.

The operation handling ability measurement device 3, when the measurement of the characteristic value of the operation handling ability of an operator with respect to all the predetermined check items finishes (s24), sends the characteristic value of the operation handling ability of each check item that has been measured this time to the person and machine matching device 1 (s25). The operation handling ability measurement device 3, if the registrant ID of the operator has been input in Step s25, also sends the registrant ID to the person and machine matching device 1. Conversely, if the registrant ID of the operator has not been input (if the operator is an unregistered person), the operation handling ability measurement device 3 sends a code that indicates that the operator is an unregistered person, to the person and machine matching device 1.

The person and machine matching device 1, if the operator of which the characteristic value of the operation handling ability has been sent is an unregistered person, adds a registrant ID to the operator. The person and machine matching device 1 associates and temporarily stores the characteristic value of the operation handling ability and the registrant ID, and performs an operator type identification process to be described below. Further, the person and machine matching device 1 sends the registrant ID added to the unregistered person back to the operation handling ability measurement device 3.

The operation handling ability measurement device 3 issues a medium in which the registrant ID is recorded (s26), and ends the process. In Step s26, for example, an ID issuance form on which the registrant ID is printed is ejected. In Step s26, the ID issuance form may be ejected only when the current operator is an unregistered person, or the ID issuance form may be ejected again even when the operator a registered person. In addition, the registrant ID may be printed as a QR Code (registered trademark) or the like, and may be able to be read mainly with a portable terminal and stored. Step s26 is configured to notify an operator of the registrant ID of the operator.

Figure 14:
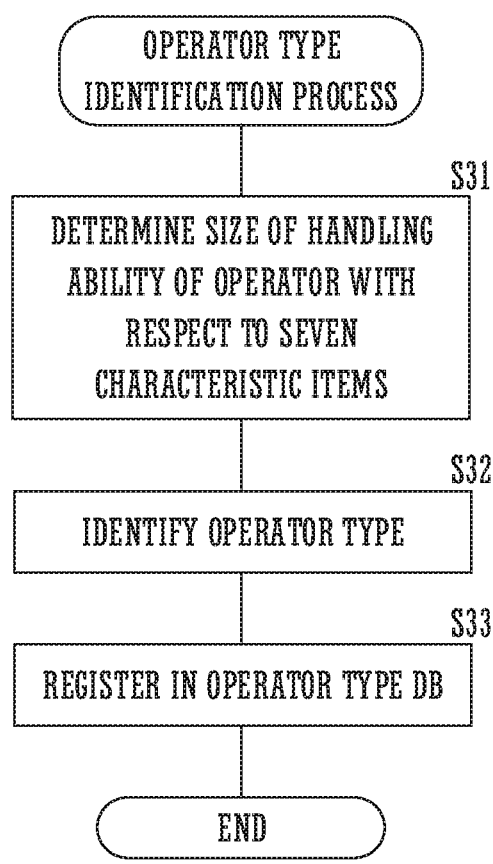
FIG. 14 is a flow chart of an operator type identification process.

Subsequently, a description will be given of a process (operator type identification process) in which the person and machine matching device 1 identifies an operator type from the characteristic value of an operation handling ability related to each check item, the characteristic value having been measured by the operation handling ability measurement device 3. FIG. 14 is a flow chart of the operator type identification process.

The person and machine matching device 1, as described above, stores the operator type classification table 18 shown in FIG. 4.

The person and machine matching device 1, with respect to an operator of which the operator type is to be identified this time, determines which of the three levels of large, medium, and small is the size of the operation handling ability of the operator, with respect to the seven characteristic items of "the position and size of a screen" and "the size and type of a letter" related to the operating characteristics of a visual interface, "a fingertip," "a grip," and "rotation, push-pull" related to the operating characteristics of dynamic operation, and "the amount and depth of necessary knowledge" and "the complexity of operation" related to the operating characteristics of information understanding (s31). In Step s31, the size of the operation handling ability of the operator is determined with respect to the seven characteristic items from the characteristic value of the operation handling ability related to each check item that has been measured by the operation handling ability measurement device 3.

The person and machine matching device 1 stores the operator type classification table 18 shown in FIG. 4. The person and machine matching device 1 identifies an operator type according to the combination of the size of the handling ability of an operator, related to the operation, the size having been determined with respect to each of the characteristic items in Step s31 (s32).

The operator type, as described above, includes six types. Since the person and machine matching device 1, in Step s32, determines the size of the handling ability of an operator by the three levels with respect to each of the characteristic items (seven items), the total number of combinations of a determination result is 2187, which is are far more than the operator types (six types). Thus, there is a high possibility that the combination of the size of the operation handling ability of each of the characteristic items, the combination having been determined on the basis of the characteristic value of each check item, the characteristic value having been input from the operation handling ability measurement device 3 does not completely match any of the operator types registered in the operator type classification table 18. The person and machine matching device 1, with respect to the operator of which the combination of the size of the operation handling ability of an operator in each of the characteristic items, the size having been determined in Step s31, does not completely match any of the operator types registered in the operator type classification table 18, identifies one of the operator types registered in the operator type classification table 18, using technology such as known fuzzy inference.

The person and machine matching device 1 generates a record in which the registrant ID and the operator type that has been identified in Step s32 are associated with each other, and registers the record in the operator type DB 16 (s33).

Accordingly, the record of the operator of which the characteristic value related to the operation handling ability is measured by the operation handling ability measurement device 3 is registered in the operator type DB 16, the record including the registrant ID and the operator type that are associated with each other.

Figure 15:
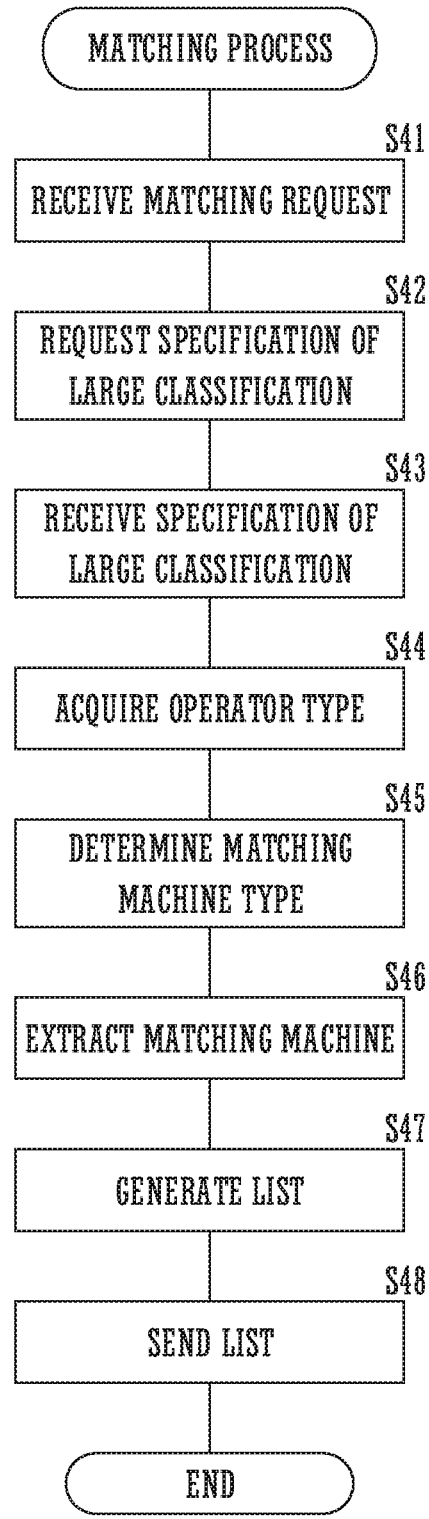
FIG. 15 is a flow chart of a matching process.

Subsequently, a description will be given of a process (matching process) in which the person and machine matching device 1 presents a machine that matches a registrant. FIG. 15 is a flow chart of the matching process.

A registrant, by mainly using a terminal 4, accesses the person and machine matching device 1 and makes a matching request to request presentation of a machine that matches the registrant. The matching request may include the registrant ID.

The person and machine matching device 1, when receiving the matching request (s41), requests the terminal 4 to specify the large classification of a machine that is requested to be presented as a matching machine (s42).

The registrant operates the terminal 4 according to the request and sends the large classification of a machine, such as a vehicle, a television, a personal computer, and a smart phone, to the person and machine matching device 1.

The person and machine matching device 1, when receiving the specification of the large classification of a machine (s43), acquires an operator type of the registrant (s44). In Step s44, the person and machine matching device 1 searches the operator type DB 16, using the registrant ID that has been received in Step s41, as a key, and acquires an operator type with respect to a corresponding registrant.

The person and machine matching device 1 determines a machine type that matches the operator type that has been acquired in Step s44 (s45). In Step S45, the person and machine matching device 1, using the matching table 19 shown in FIG. 5, determines a matching machine type (machine type that associates "o" with the operator type that has been acquired in Step s44 in FIG. 5).

The person and machine matching device 1 extracts a machine that matches the operation handling ability of the registrant (s46). In Step s46, the person and machine matching device 1 searches the machine type DB 15, and extracts a machine of which the machine type is the machine type that has been determined in Step s45, the machine belonging to the large classification that has been received in Step s41.

The person and machine matching device 1 generates a list of machines that have been extracted in Step s46 (matching determination result information according to the present invention) (s47). In Step s47, the person and machine matching device 1, for each machine that has been extracted in Step s46, generates a list to which the manufacturer and the model name of the machine are added.

The person and machine matching device 1 sends the list that has been generated in Step s47 to the terminal 4 (s48) and ends the process.

Accordingly, the registrant, in the terminal 4, can know a machine of a specified large classification, the machine (model) corresponding to the operation handling ability of the registrant. In other words, the person and machine matching device 1, with respect to the registrant, can present the machine (model) corresponding to the operation handling ability of the registrant. Therefore, the user (registrant) can reduce the time and effort related to selection of a machine (model) that the user can operate smoothly. For example, the registrant, when renting a car, can easily confirm a vehicle type of the operability at matches the operation handling ability of the registrant. In addition, registrant, when buying a new portable terminal such as a smart phone, can easily confirm a terminal of which the operability matches the operation handling ability of the registrant.

In addition, while, in the above described preferred embodiment, the registrant requests a matching machine (model) by specifying the large classification of a machine, the registrant may specify a plurality of machines (models) so as ask whether or not each specified machine (model) matches the operation handling ability of the registrant, for example.

Figure 16:
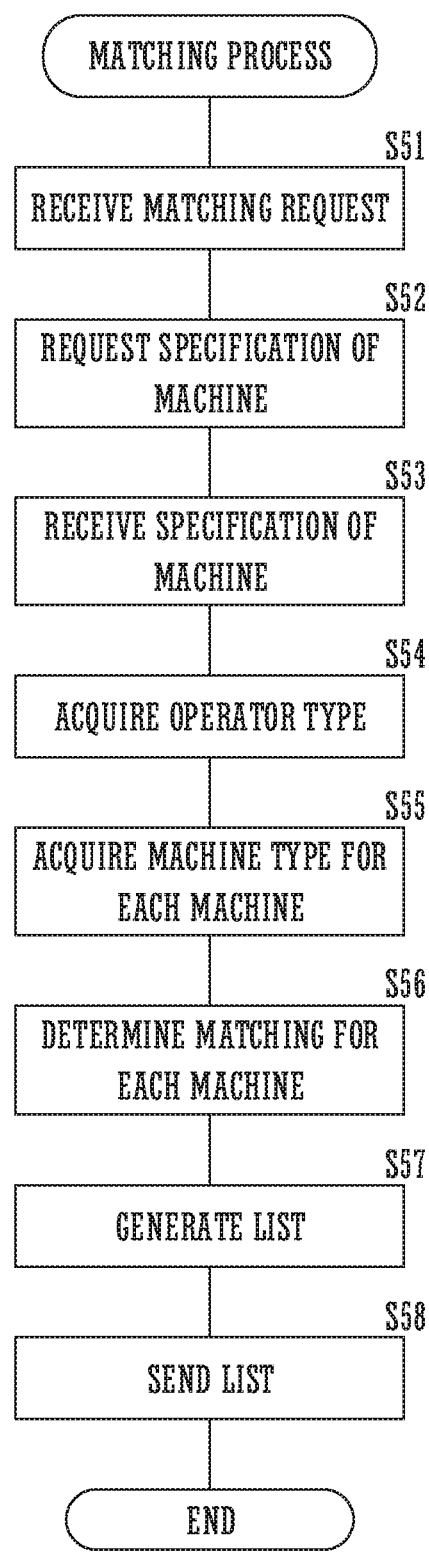
FIG. 16 is a flow chart of a matching process according to another preferred embodiment.

FIG. 16 is a flow chart of a matching process according to the preferred embodiment. A registrant, by mainly using the terminal 4, accesses the person and machine matching device 1 and makes a matching request to request determination of whether or not a machine matches the operation handling ability of the registrant. The matching request may include the registrant ID.

The person and machine matching device 1, when receiving the matching request (s51), makes a request to the terminal 4 to specify a machine to be determined about whether or not the machine is matched (s52).

The registrant operates the terminal 4 according to the request, and, for each machine for which the determination of whether or not the machine is matched is requested, inputs a manufacturer and a model name to send to the person and machine matching device 1. A machine for which the determination of whether or not the machine is matched is requested may be one or may be two or more. In addition, in a case in which the determination of whether or not the machine is matched is requested for a plurality of machines, the large classification of the plurality of machines may be the same or may be different.

The person and machine matching device 1, when receiving the specification of the machine (one machine or a plurality of machines) to be determined about whether or not the machine is matched (s53), acquires the operator type of the registrant (s54). Step s54 is the same process as the above described Step s44.

The person and machine matching device 1, for each machine of which the specification has been received in Step s53, searches the machine type DB 15, and acquires a machine type of the machine (s55).

The person and machine matching device 1, for each machine of which the specification has been received in Step s53, determines whether or not the machine type that has been acquired in Step s55 and the operator type that has been acquired in Step s54 are matched (s56). In Step s56, the person and machine matching device 1 uses the matching table 19 shown in FIG. 5 to make a determination of whether or not the machine type and the operator type are matched. In Step s56, the determination is made not by two values of matched and unmatched but by three values including unknown.

The person and machine matching device 1, for each machine of which the specification has been received in Step s53, generates a list in which the machine is associated with the determination result in Step s56 (s57). The person and machine matching device 1 sends the list that has been generated in Step s57 to the terminal 4 (s58), and ends the process.

Accordingly, the registrant, in the terminal 4, can know a machine (model) corresponding to the operation handling ability of the registrant. For example, in a case in which a person who worked in a factory production line is a registrant, a step in which the registrant is made to work is able to be determined appropriately and easily by specifying a machine (model) to be used in each process of the production line.

In addition, while, in the above described preferred embodiment, a machine type of a machine is determined by making an operator actually operate the machine (model) and acquiring a characteristic value related to the operability of the machine, the design data of the machine may be input so as to determine a machine type from the design data, for example.

In addition, while, in the above described preferred embodiment, the person and machine matching device 1, for each registrant, stores the operator type of the registrant in the operator type DB 16, the operator type may be notified to the registrant when the operation handling ability is measured by the operation handling ability measurement device 3. In such a case, when the above described matching process is performed, the registrant can input the own operator type. Such a configuration makes it possible to eliminate the need for the operator type DB 16 and reduce the cost of the person and machine matching device 1. In addition, in such a case, it is unnecessary to issue the registrant ID.

In addition, while, in the above described preferred embodiment, the person and machine matching device 1 is configured to perform a process of determining a machine type, the operating characteristic measurement device 2 may be configured to store the machine type classification table 17 shown in FIG. 3 and determine a machine type. Such a configuration makes it possible to reduce communication cost since the operating characteristic measurement device 2 simply notifies the person and machine matching device 1 of the model data and a determined machine type.

Alternatively, the operation handling ability measurement device 3 may be configured to store the operator type classification table 18 shown in FIG. 4, determine an operator type, and notify an operator of the operator type in Step s26. In such a case, if, as stated above, the person and machine matching device 1 is configured not to be provided with the operator type DB 16, the operation handling ability measurement device 3 is able to eliminate the need for communication with the person and machine matching device 1.

In addition, the process related to the determination of a machine type or the process related to the determination of an operator type is not limited to the above described preferred embodiment, and the determination may be made by any process.

REFERENCE SIGNS LIST

1 Matching device
2 Operating characteristic measurement device
3 Operation handling ability measurement device
4 Terminal
11 Control unit
12 Storage unit
13 Communication unit
15 Machine type database (machine type DB)
16 Machine type database (operator type DB)
17 Machine type classification table
18 Operator type classification table
19 Matching table

The invention claimed is:

1. A person and machine matching device comprising:
a machine type storage unit configured to store a machine type obtained by classifying a machine that operates according to operation of an operator on a basis of operability of the machine;
a matching determination unit configured to determine matching between an operator type obtained by classifying an operator on the basis of a machine operation handling ability and the machine type classified on the basis of the operability of the machine;
a matching determination result information generation unit configured to generate matching determination result information with the machine of which the machine type is stored in the machine type storage unit, on the basis of a determination result obtained by the matching determination unit that has determined, with respect to a specified operator, the matching between the operator type of the specified operator and the machine type; and
an output unit configured to output to the specified operator the matching determination result information that has been generated by the matching determination result information generation unit,
wherein:
the person and machine matching device further comprises:
a machine type classification table storage unit configured to store, for each machine type, a machine type classification table in which a size of an operation handling ability required for the operator is determined, with respect to a plurality of items related to the operability of the machine;
a machine type identification unit configured to perform identification of the machine type of the machine that operates according to the operation of an operator, referring to the machine type classification table, with the size of the operation handling ability required for the operator, the size having been determined with respect to the plurality of items related to the operability of the machine, by using a characteristic value of operability of a visual interface, a characteristic value of operability of dynamic operation, and a characteristic value of operability of information understanding that have been obtained, during operation of the machine by an operator who wears a measurement device, by processing an output of the measurement device; and an operator type identification unit configured to identify the operator type of the operator, by using a characteristic value of the operation handling ability of a visual interface, a characteristic value of the operation handling ability of dynamic operation, and a characteristic value of the operation handling ability of information understanding that have been measured with respect to the operator, by simulation related to machine operation that the operator is made to run in an operation handling ability measurement device;
the simulation related to machine operation in the operation handling ability measurement device is simulation that measures, with respect to the operator, the characteristic value of the operation handling ability of a visual interface, the characteristic value of the operation handling ability of dynamic operation, and the characteristic value of the operation handling ability of information understanding while changing an operation situation of the operator; and
the machine type storage unit, with respect to the machine that operates according to the operation of an operator, stores the machine type that has been identified by the machine type identification unit.

2. The person and machine matching device according to claim 1, wherein the matching determination result information generation unit extracts from the machine type storage unit a machine of which the machine type matches the operator type of the specified operator and generates a list of an extracted machine as the matching determination result information.

3. The person and machine matching device according to claim 1, wherein the matching determination result information generation unit generates a list in which a specified machine is associated with the determination result in the matching determination unit as the matching determination result information.

4. The person and machine matching device according to claim 1, further comprising an operator type classification table storage unit configured to store, for each operator type, an operator type classification table in which a size of the machine operation handling ability of the operator is determined, with respect to a plurality of items related to machine operation, wherein the operator type identification unit performs identification of the operator type, referring to the operator type classification table, with the size of the machine operation handling ability, the size having been determined, with respect to the plurality of items related to the machine operation, by using the characteristic value of the operation handling ability of a visual interface, the characteristic value of the operation handling ability of dynamic operation, and the characteristic value of the operation handling ability of information understanding that have been measured with respect to the operator.

5. The person and machine matching device according to claim 1, further comprising an operator type storage unit configured to store, for each operator, the operator type that the operator type identification unit has identified.

6. The person and machine matching device according to claim 1, further comprising a matching table storage unit configured to store a matching table in which whether the machine type and the operator type are matched is determined for each combination of the machine type and the operator type, wherein the matching determination unit determines matching between the machine type and the operator type, referring to the matching table.

7. A person and machine matching method executed by a computer, the method comprising:
- a machine type storage step of storing a machine type in a machine type storage unit, the machine type being obtained by classifying a machine that operates according to operation of an operator on a basis of operability of the machine;
- a matching determination step of determining matching between an operator type obtained by classifying an operator on the basis of a machine operation handling ability and the machine type classified on the basis of the operability of the machine;
- a matching determination result information generation step of generating matching determination result information with the machine of which the machine type is stored in the machine type storage unit, with respect to a specified operator, on the basis of a determination result obtained in the matching determination step in which the matching between the operator type of the specified operator and the machine type has been determined; and
- an output step of outputting to the specified operator the matching determination result information that has been generated in the matching determination result information generation step, wherein:

the method further comprises:
- a machine type classification table storage step of storing, for each machine type, a machine type classification table in which a size of an operation handling ability required for the operator is determined, with respect to a plurality of items related to the operability of the machine;
- a machine type identification step of performing identification of a machine type of the machine that operates according to the operation of an operator, referring to the machine type classification table, with the size of the operation handling ability required for the operator, the size having been determined with respect to the plurality of items related to the operability of the machine, by using a characteristic value of operability of a visual interface, a characteristic value of operability of dynamic operation, and a characteristic value of operability of information understanding that have been obtained, during operation of the machine by an operator who wears a measurement device, by processing an output of the measurement device; and
- an operator type identification step of identifying the operator type of the operator, by using a characteristic value of the operation handling ability of a visual interface, a characteristic value of the operation handling ability of dynamic operation, and a characteristic value of the operation handling ability of information understanding that have been measured with respect to the operator, by simulation related to machine operation that the operator is made to run in an operation handling ability measurement device;

the simulation related to machine operation in the operation handling ability measurement device is simulation that measures, with respect to the operator, the characteristic value of the operation handling ability of a visual interface, the characteristic value of the operation handling ability of dynamic operation, and the characteristic value of the operation handling ability of information understanding while changing an operation situation of the operator; and the machine type storage step is a step of storing, with respect to the machine that operates according to the operation of an operator, the machine type that has been identified by the machine type identification step, in the machine type storage unit.

8. A non-transitory computer readable medium storing a person and machine matching program that when executed causes a computer to execute steps comprising:
- a machine type storage step of storing a machine type in a machine type storage unit, the machine type being obtained by classifying a machine that operates according to operation of an operator on a basis of operability of the machine;
- a matching determination step of determining matching between an operator type obtained by classifying an operator on the basis of a machine operation handling ability and the machine type classified on the basis of the operability of the machine;
- a matching determination result information generation step of generating matching determination result information with the machine of which the machine type is stored in the machine type storage unit, with respect to a specified operator, on the basis of a determination result obtained in the matching determination step in which the matching between the operator type of the specified operator and the machine type has been determined; and
- an output step of outputting to the specified operator the matching determination result information that has been generated in the matching determination result information generation step, wherein:

the steps further comprise:
- a machine type classification table storage step of storing, for each machine type, a machine type classification table in which a size of an operation handling ability required for the operator is determined, with respect to a plurality of items related to the operability of the machine;
- a machine type identification step of performing identification of a machine type of the machine that operates according to the operation of an operator, referring to the machine type classification table, with the size of the operation handling ability required for the operator, the size having been determined with respect to the plurality of items related to the operability of the machine, by using a characteristic value of operability of a visual interface, a characteristic value of operability of dynamic operation, and a characteristic value of operability of information understanding that have been obtained, during operation of the machine by an operator who wears a measurement device, by processing an output of the measurement device; and
- an operator type identification step of identifying the operator type of the operator, by using a characteristic value of the operation handling ability of a visual interface, a characteristic value of the operation handling ability of dynamic operation, and a characteristic value of the operation handling ability of information understanding that have been measured with respect to the operator, by simulation related to machine operation that the operator is made to run in an operation handling ability measurement device the simulation related to machine operation in the operation handling ability measurement device is simulation that measures, with respect to the operator, the characteristic value of the operation handling ability of a visual interface, the characteristic value of the operation handling ability of dynamic operation, and the characteristic value of the operation handling ability of information understanding while changing an operation situation of the operator; and the machine type storage step is a step of storing, with respect to the machine that operates according to the operation of an operator, the machine type that has been identified by the machine type identification step, in the machine type storage unit.

\* \* \* \* \*